(12) United States Patent
Niedenzu (10) Patent No.: US 11,605,950 B2
(45) Date of Patent: Mar. 14, 2023

(54) DEVICE FOR A LOW-VOLTAGE CIRCUIT FOR UNBALANCED LOAD REDUCTION

(71) Applicant: Siemens Aktiengesellschaft, Munich (DE)

(72) Inventor: Wolfgang Niedenzu, Kelheim (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 66 days.

(21) Appl. No.: 17/271,709

(22) PCT Filed: Jul. 10, 2019

(86) PCT No.: PCT/EP2019/068612
§ 371 (c)(1),
(2) Date: Feb. 26, 2021

(87) PCT Pub. No.: WO2020/043380
PCT Pub. Date: Mar. 5, 2020

(65) Prior Publication Data
US 2021/0320497 A1 Oct. 14, 2021

(30) Foreign Application Priority Data
Aug. 30, 2018 (DE) ...................... 10 2018 214 747.7

(51) Int. Cl.
*H02J 3/26* (2006.01)
*B60L 53/60* (2019.01)
*H02J 7/00* (2006.01)

(52) U.S. Cl.
CPC .............. *H02J 3/26* (2013.01); *B60L 53/60* (2019.02); *H02J 7/0013* (2013.01)

(58) Field of Classification Search
CPC ............ H02J 3/26; H02J 7/0013; B60L 53/60
(Continued)

(56) References Cited

U.S. PATENT DOCUMENTS

| 8,774,977 B2 * | 7/2014 | Smith | ...................... G05F 5/00 700/297 |
| 10,038,320 B2 * | 7/2018 | Guillemin | ................. H02J 3/26 |

(Continued)

FOREIGN PATENT DOCUMENTS

| CN | 106300396 A | 1/2017 |
| DE | 102011078047 A1 | 12/2012 |

(Continued)

OTHER PUBLICATIONS

PCT International Search Report dated Oct. 1, 2019 corresponding to PCT International Application No. PCT/EP2019/068612 filed Jul. 10, 2019.

(Continued)

*Primary Examiner* — Hal Kaplan
(74) *Attorney, Agent, or Firm* — Harness, Dickey & Pierce, P.L.C.

(57) ABSTRACT

A device, for a low-voltage circuit, includes a four-pole input connection for a three-phase AC circuit having a neutral conductor, including a first, second and third input phase pole, and an input neutral conductor pole; a two-pole output connection; a first connection between the between the input and output neutral conductor pole; a first, second and third electronic switch unit to carry out opening and closing of an electrical connection; a voltage sensor for determining the voltage level of the input phase poles; and a controller connected to the voltage sensor and the electronic switch units, designed such that, depending on the voltage level of the input phase poles, the first, second or third input phase pole is connected to the first output phase pole via the respective electronic switch unit, the first output phase pole being connected to the respective input phase pole having the highest voltage level.

16 Claims, 7 Drawing Sheets

(58) Field of Classification Search
USPC .......................................................... 307/31
See application file for complete search history.

(56) References Cited

U.S. PATENT DOCUMENTS

2013/0030588 A1    1/2013   Smith et al.
2016/0105024 A1    4/2016   Guillemin et al.

FOREIGN PATENT DOCUMENTS

| DE | 102015000076 A1 | 7/2016 |
| DE | 102015105152 A1 | 10/2016 |
| WO | WO 2014191692 A1 | 12/2014 |

OTHER PUBLICATIONS

Written Opinion of International Searching Authority dated Oct. 1, 2019 corresponding to PCT International Application No. PCT/EP2019/068612 filed Jul. 10, 2019.

German Office Action for German Application No. 10 2018 214 747.7 dated Mar. 22, 2019.

\* cited by examiner

DEVICE FOR A LOW-VOLTAGE CIRCUIT FOR UNBALANCED LOAD REDUCTION

PRIORITY STATEMENT

This application is the national phase under 35 U.S.C. § 371 of PCT International Application No. PCT/EP2019/068612 which has an International filing date of Jul. 10, 2019, which designated the United States of America and which claims priority to German patent application number DE 102018214747.7 filed Aug. 30, 2018, the entire contents of each of which are hereby incorporated herein by reference.

FIELD

Embodiments of the invention generally relate to a device for a low-voltage circuit, to a method for a three-phase low-voltage circuit having a neutral conductor and three phase conductors, and to a system for a three-phase low-voltage circuit having a neutral conductor and three phase conductors.

BACKGROUND

A low voltage is understood to mean voltages up to 1000 volts AC voltage or 1500 volts DC voltage. A low voltage is understood more specifically to mean in particular voltages that are greater than a small voltage, with values of 50 volts AC voltage or 120 volts DC voltage.

Low-voltage circuits are understood to mean circuits with the voltages, for currents of 10 to 6300 amperes. The currents are understood to mean in particular nominal currents or regular maximum currents of the circuit.

Three-phase low-voltage circuits are accordingly for example 400-volt (phase-to-phase)/230-volt (phase-to-neutral conductor) circuits or power grids having three phase conductors and a neutral conductor, as are usually encountered in Europe.

The three-phase power grid is generally loaded asymmetrically with single-phase energy sinks or consumers, such as operating means, storage units or/and generators. In recent times, particularly asymmetric loading has been caused by high-power chargers for or of electric vehicles, which will increase in the future and lead increasingly to unbalanced loads (asymmetric loading) in the circuit or (power) grid. Even the even distribution of single-phase charging connections to individual phases, due to the statistical distribution of the charging processes, does not lead to a balance. A similar problem exists in the case of battery storage units, for example in private households, which are usually also operated only in single-phase mode, or in the case of photovoltaic installations (in the case as a generator). Three-phase AC circuits are usually designed for (approximately) symmetrical loading. Asymmetric loading leads to high compensation currents in the neutral conductor, which should be avoided.

CN 106 300 396 A furthermore discloses a charging switching device for electric vehicles for performing three-phase load balancing and to a method therefor. WO 2014/191692 A1 furthermore discloses a phase selection for a multiphase installation.

SUMMARY

At least one embodiment of the present invention specifies a device for improving the symmetry of a three-phase AC power grid having a neutral conductor, which device in particular operates rapidly.

Embodiments of the present invention are directed to a device; a method; and a system.

According to at least one embodiment of the invention, what is proposed is a device that allows a consumer to change phase to a phase that is less loaded or that assigns phases of a consumer to the phases of the low-voltage circuit such that the phases (phase conductors) are loaded as evenly as possible. This is performed according to the invention by electronic switching units. According to at least one embodiment of the invention, an electronic switching unit is understood to mean a unit that performs semiconductor-based closing and opening of an electrical connection. Electromechanical switching units, that is to say those having mechanical contacts, are not included.

BRIEF DESCRIPTION OF THE DRAWINGS

In the associated drawings.

DETAILED DESCRIPTION OF THE EXAMPLE EMBODIMENTS

According to at least one embodiment of the invention, what is proposed is a device that allows a consumer to change phase to a phase that is less loaded or that assigns phases of a consumer to the phases of the low-voltage circuit such that the phases (phase conductors) are loaded as evenly as possible. This is performed according to the invention by electronic switching units. According to at least one embodiment of the invention, an electronic switching unit is understood to mean a unit that performs semiconductor-based closing and opening of an electrical connection. Electromechanical switching units, that is to say those having mechanical contacts, are not included.

The criterion for changing a consumer over onto a phase may, according to at least one embodiment of the invention, firstly be the level of the voltage. The phase having the highest voltage (effective value of the voltage) is often the least-loaded phase. That is to say, the consumer is assigned to the phase having the highest voltage.

The criterion for changing a consumer over onto a phase may, according to the invention, secondly be the level of the current. The phase having the lowest current (effective value of the current) is the least-loaded phase. That is to say, the consumer is assigned to the phase having the lowest current.

The device furthermore has a frequency sensor for ascertaining the frequency of the electric current of the first, second and third input phase pole that is connected to the control unit. In one refinement, the frequency of the voltage of the respective input phase pole may additionally be ascertained.

This has the particular advantage that for example a phase change is able to take place at the zero crossing of the current or/and of the voltage. A very rapid phase change may additionally take place by virtue of the electronic switching units, such that the phase change takes place virtually unnoticed. As a result, it is possible firstly to perform switching in a power-free manner and secondly to achieve a smooth transition in the case of the phase change.

In one alternative refinement, the assignment may be performed by a superordinate management system. That is to say, the device has a communication interface by way of which it is possible to define the assignment of a consumer to a phase (or the assignment of the consumer-side phases (phase conductors) to the energy source-side phases (phase conductors)), for example by way of a communication signal.

This has the particular advantage that more even loading of a three-phase AC power grid is made possible, wherein electronic switching units allow a particularly rapid (in the microsecond or single-digit millisecond range) and for example power-free changeover, wherein the number of switching cycles is almost unlimited in the case of a power-free changeover.

Advantageous refinements are specified in the claims.

In one advantageous refinement of the invention, the device is arranged in a housing.

This has the particular advantage that a compact unit is made available that is able to be interposed in a branch for the connection of a consumer in order to achieve approximately symmetrical loading.

In one advantageous refinement of the invention, depending on the refinement, an (internal) current sensor for ascertaining the level of the current of the first output phase pole or/and a voltage sensor for ascertaining the level of the voltage of the first, second and third input phase pole is provided. This is/these are connected to the control unit.

This has the particular advantage that, in addition to the criterion of voltage or current, a further criterion (in addition to current or voltage) is available for phase selection. An even better phase selection or assignment is thereby able to be achieved.

In one advantageous refinement of the invention, the electronic switching units are designed as semiconductor switches, and in particular have power semiconductors based on silicon, silicon carbide, silicon carbon, gallium, gallium nitride or gallium nitrogen.

This has the particular advantage that a simple implementation of the semiconductor switches or electronic switching units is possible, these allowing low losses and high switching powers.

A coordinate advantageous method and a system for changing phase are furthermore claimed.

All refinements, both in dependent form referring back to the claims and referring back only to individual features or combinations of features of patent claims, bring about an improvement in the symmetrical loading of a three-phase AC circuit.

The described properties, features and advantages of this invention and the manner in which these are achieved will become clearer and more clearly comprehensible in connection with the following description of the exemplary embodiments, which are explained in more detail in connection with the drawing.

Figure 1:
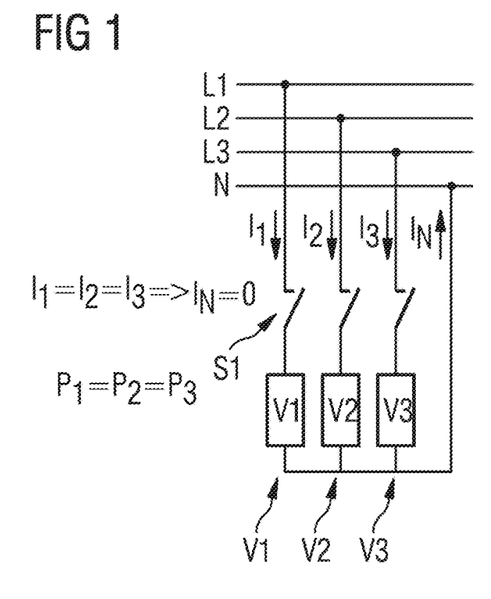
FIGS. 1 to 9 show circuits for explaining the embodiments of the invention.

FIG. 1 shows a circuit for explaining an embodiment of the invention, having a first phase conductor L1, a second phase conductor L2, a third phase conductor L3 and a neutral conductor N of a three-phase low-voltage circuit. The three-phase low-voltage circuit has a branch, wherein a first consumer V1 (energy sink) is connected to the first phase conductor L1 and the neutral conductor N, a second consumer V2 is connected to the second phase conductor L2 and the neutral conductor N, and a third consumer V3 is connected to the third phase conductor L3 and the neutral conductor N. The connection of the three consumers V1, V2, V3 to the phase conductors L1, L2, L3 has a three-phase switch S1. If the resistances of the first, second and third consumer are equal, the same power is converted in the consumers V1, V2, V3, that is to say the first power P1 of the first consumer V1, the second power P2 of the second consumer V2 and the third power P3 of the third consumer V3 are equal; P1=P2=P3. The first current I1 of the first consumer V1, the second current I2 of the second consumer V2 and the third current I3 of the third consumer V3 are therefore equal (this means the phase conductor current; the first current I1 flows in the branch of the first phase conductor L1 to the first consumer V1, the second current I2 flows in the branch of the second phase conductor L2 to the second consumer V2, the third current I3 flows in the branch of the third phase conductor L3 to the consumer V3), I1=I2=I3. The current in the neutral conductor N is therefore equal to zero. The three-phase AC circuit is loaded symmetrically.

Figure 2:
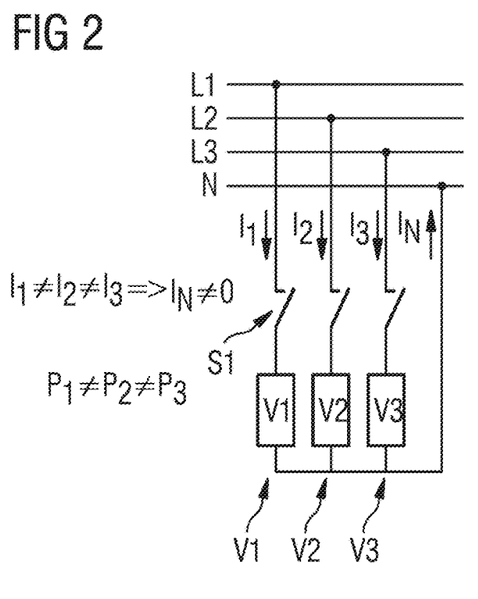

FIG. 2 shows a circuit according to FIG. 1, with the difference that the resistances of the first, second and third consumer V1, V2, V3 are different. There are therefore also different first, second and third powers P1, P2, P3 of the consumers, P1≠P2≠P3. The first to third currents I1, I2, I3 are therefore also different, I1≠I2≠I3. A compensation current therefore flows in the neutral conductor N, In≠0. The three-phase AC circuit is loaded asymmetrically.

Figure 3:
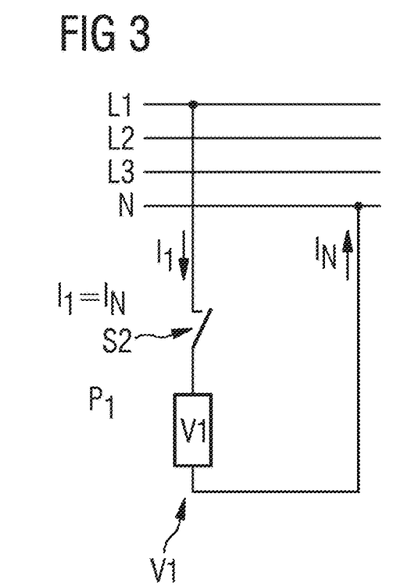

FIG. 3 shows a circuit according to FIG. 1 or FIG. 2, with the difference that only the first consumer V1 is connected to the three-phase AC circuit. The three-phase AC circuit has only a single-phase switch S2. The first current I1 of the branch to the first consumer V1 is in this case equal to the current in the neutral conductor N, I1=In. That is to say, the three-phase AC circuit is loaded asymmetrically by a single-phase consumer. The three-phase AC circuit is loaded asymmetrically.

Figure 4:
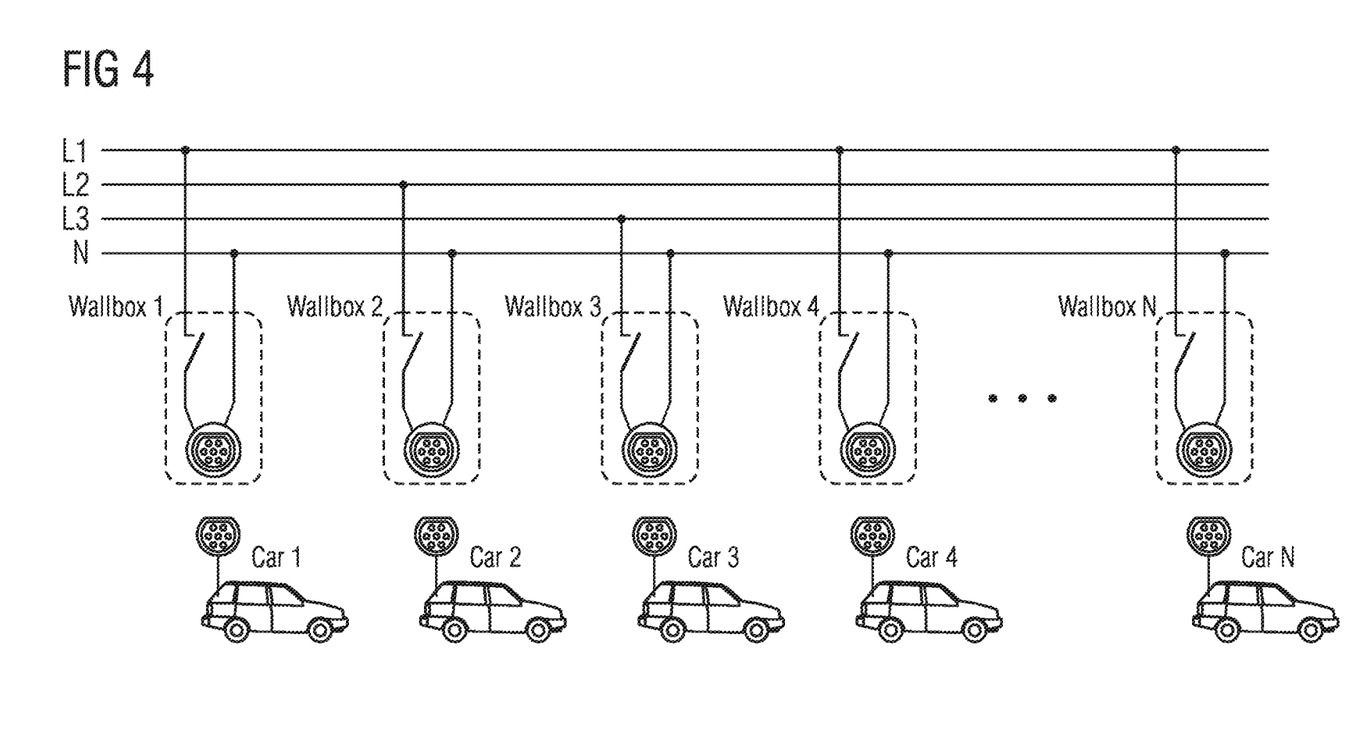

FIG. 4 shows a circuit according to FIG. 3, with the difference that, instead of the first consumer V1, a power outlet Wallbox 1 is connected as branch to the first phase conductor L1 and the neutral conductor N. A second power outlet Wallbox 2 is connected as branch to the second phase conductor L2 and the neutral conductor N. A third power outlet Wallbox 3 is connected as branch to the third phase conductor L3 and the neutral conductor N. Further power outlets Wallbox 4 . . . Wallbox N may in the same way be connected in the form of a branch to the phase conductors.

Electric cars Car 1, Car 2, Car 3, Car 4, Car N may for example be connected to the power outlets as consumers.

Figure 5:
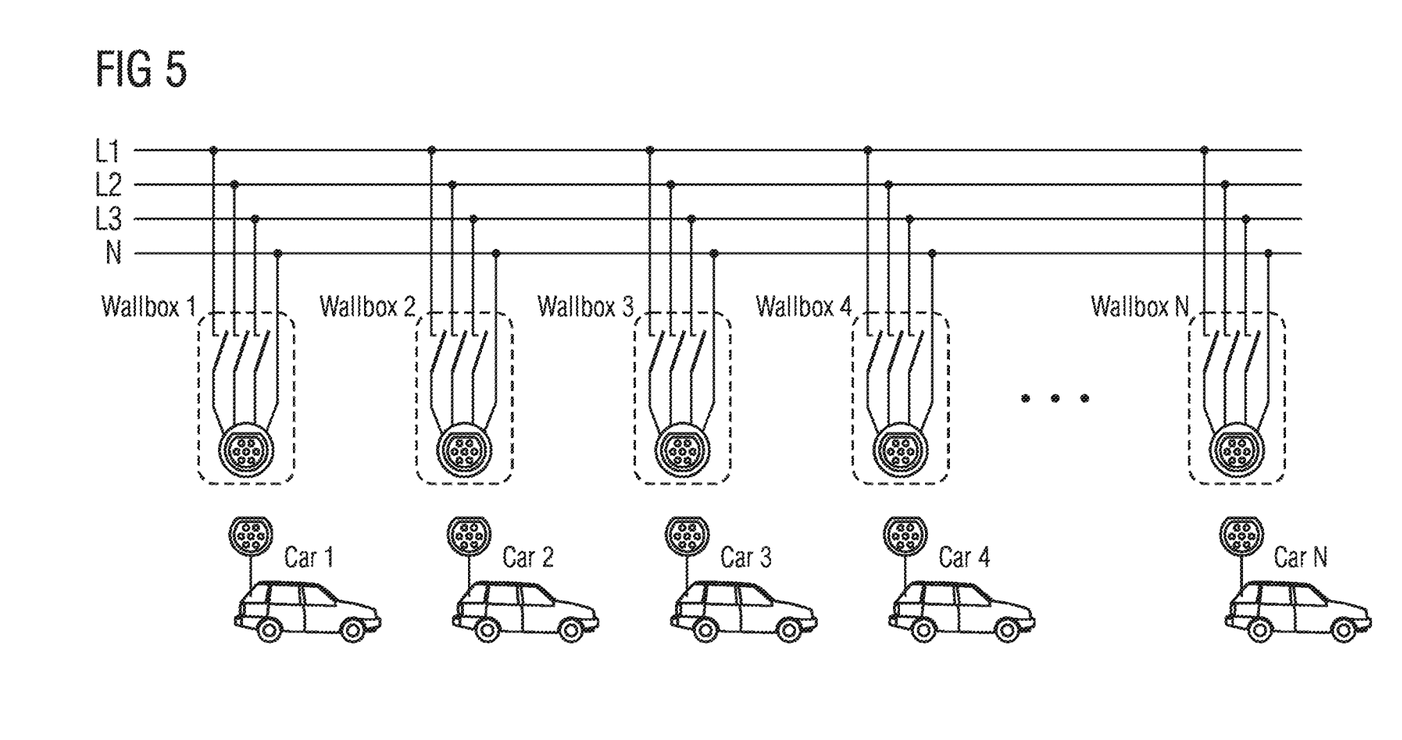

FIG. 5 shows a circuit according to the previous figures, with the difference that the power outlets are of 3-phase design, meaning that the power outlets are connected as a branch to the three phase conductors L1, L2, L3 and the neutral conductor N.

Figure 6:
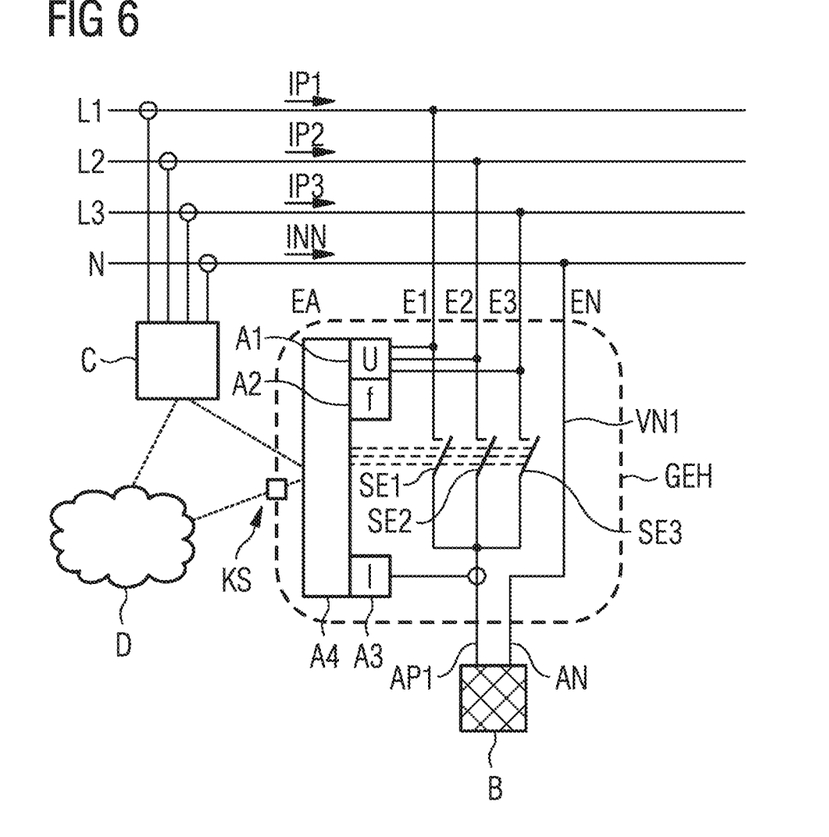

FIG. 6 shows a circuit according to the previous figures, with the difference that a device EA according to an embodiment of the invention is provided. The device has:

a four-pole input connection for a three-phase AC circuit having a neutral conductor, having a first, second and third input phase pole E1, E2, E3 and an input neutral conductor pole EN, a two-pole output connection having a first output phase pole AP1 and an output neutral conductor pole AN;

a first connection VN1 between input neutral conductor pole EN and output neutral conductor pole AN;

a first, second and third electronic switching unit SE1, SE2, SE3 that performs semiconductor-based closing and opening of an electrical connection, wherein the first electronic switching unit SE1 is connected at input to the first input phase pole E1, the second electronic switching unit SE2 is connected at input to the second input phase pole E2 and the third electronic switching unit SE3 is connected at input to the third input phase pole E3;

the first, second and third electronic switching unit SE1, SE2, SE3 are connected at output to the first output phase pole AP1;

a voltage sensor A1 or U for ascertaining the level of the voltage of the first, second and third input phase pole E1, E2, E3, that is to say of three individual voltages; and a control unit A4 that is connected to the voltage sensor A1, the first, second and third electronic switching unit SE1, SE2, SE3 and is designed such that, depending on the level of the voltage of the first, second and third input phase pole, the first, second or third input phase pole E1, E2, E3 is connected to the first output phase pole AP1 by way of the respective electronic switching unit, wherein the first output phase pole AP1 is connected in each case to the input phase pole that has the highest voltage.

In order to ascertain the level of the voltage, the voltage sensor A1 may be connected to the neutral conductor/input neutral conductor pole EN.

That is to say, if for example the first input phase pole E1 has a voltage of 228 volts, the second input phase pole E2 has a voltage of 230 volts and the third input phase pole E3 has a voltage of 232 volts, then the third input phase pole E3 is connected to the first output phase pole AP1 by way of the third electronic switching unit SE3.

The assignment may be changed periodically during operation at certain time intervals depending on how the voltage level changes. Voltage is understood to mean the effective value of the voltage. That is to say, the assignment is changed for example at least after a plurality of cycles through the sinusoidal oscillation of the AC voltage. By way of example, a change in assignment may take place after a minimum of 10 sinusoidal oscillations, provided that the voltage level changes. It is thereby possible to avoid oscillation of the device and constant changes of assignment, meaning that a stable state is able to be established.

The device EA is arranged for example in a housing GEH.

The device EA may furthermore have an internal current sensor A3 or I, that is to say for example one inside the housing GEH, for ascertaining the level of the current of the first output phase pole AP1, which is connected to the control unit A4.

The electronic switching units SE1, SE2, SE3 may be designed as semiconductor switches, in particular for example having power semiconductors, for example based on silicon, silicon carbide, silicon carbon, gallium, gallium nitride or gallium nitrogen.

The device EA may have a frequency sensor A2 or f for ascertaining the frequency of the electric current or/and the voltage of the first, second and third input phase pole E1, E2, E3 that is connected to the control unit A4. It is thereby possible for example to perform a phase change at a zero crossing.

In one alternative refinement that may be combined as desired with the abovementioned refinement, provision is made for an externally arranged external current sensor C, for example one arranged outside the housing GEH, for ascertaining the level of the current of the first, second and third energy source-side phase conductors L1, L2, L3 and possibly of the neutral conductor N of the low-voltage circuit. These phase conductors L1, L2, L3 and the neutral conductor N are connected to the first, second and third input phase poles E1, E2, E3, EN via a branch.

Further branches are usually connected to consumers at the phase conductors L1, L2, L3 and the neutral conductor N (not illustrated in FIG. 6).

The control unit A4 in this refinement is for example connected to the external current sensor C, the first, second and third electronic switching unit SE1, SE2, SE3, and designed such that, depending on the level of the current of the first, second and third energy source-side phase conductors L1, L2, L3, the first, second or third input phase pole E1, E2, E3 is connected to the first output phase pole AP1 by way of the respective electronic switching unit SE1, SE2, SE3, wherein the first output phase pole AP1 is connected in each case to the input phase pole E1, E2, E3 whose energy source-side phase conductor L1, L2, L3 has the lowest current level.

That is to say, if for example the first phase conductor L1 has a current of 70 amperes, the second phase conductor L2 has a current of 40 amperes and the third phase conductor L3 has a current of 60 amperes, then the second input phase pole E2 is connected to the first output phase pole AP1 by way of the second electronic switching unit SE2.

In the example according to the figures, a first energy source (not illustrated) is located at the left-hand end of the phase conductors L1, L2, L3 or of the neutral conductor N, at the location where the reference signs L1, L2, L3 and N are illustrated.

In one refinement, which may be combined as desired with the abovementioned refinement, provision is made for a communication interface KS, for example on the housing GEH, for a communication signal that is able to be communicated thereby. The control unit A4 that is connected to the communication unit, the first, second and third electronic switching unit, may in this case be designed such that, depending on the communication signal, the first, second or third input phase pole E1, E2, E3 is connected to the first output phase pole AP1 by way of the respective electronic switching unit SE1, SE2, SE3.

FIG. 6 shows the device EA according to an embodiment of the invention with all of these refinements, which may be used individually or selectively or together. A management system D is for example connected to the communication interface KS in the example according to FIG. 6.

A consumer or an energy sink B, such as an electric car Car 1, . . . , Car N, is connected for example to the first output phase pole AP1 and output neutral conductor pole AN.

Figure 7:
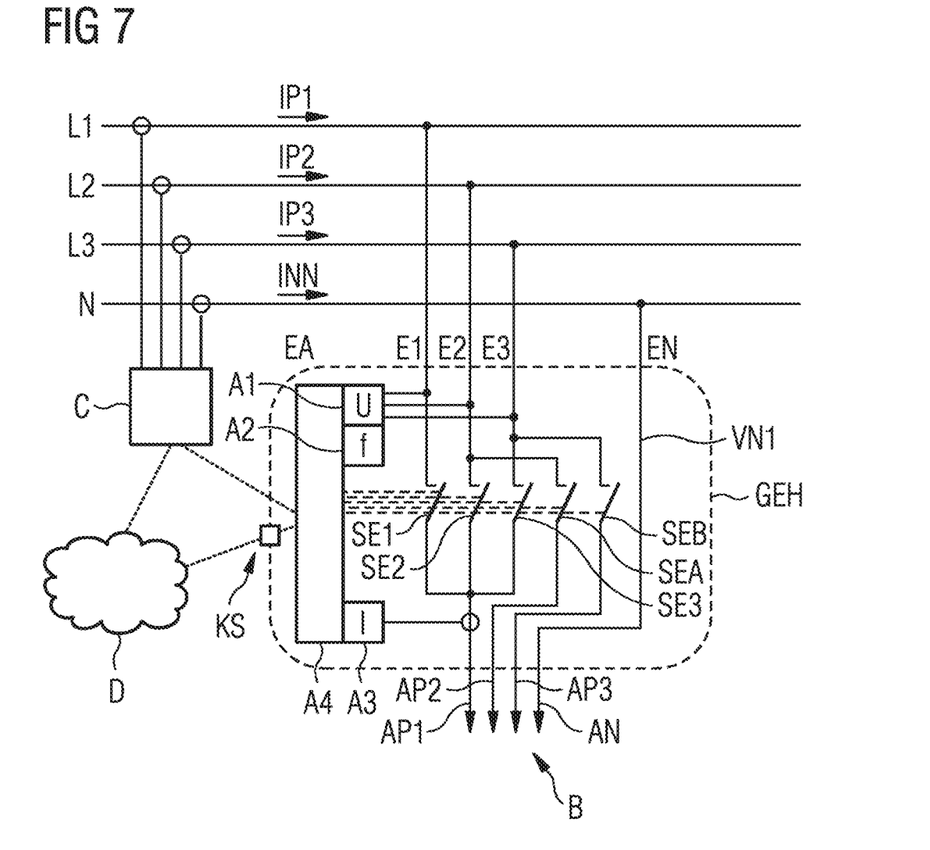

FIG. 7 shows an arrangement according to FIG. 6, with the difference that a four-pole output connection having a first, second and third output phase pole AP1, AP2, AP3 and an output neutral conductor pole AN is provided. Provision is also made for a tenth electronic switching unit SEA that is connected at input to the second input phase pole E2 and is connected at output to the second output phase pole AP2. Provision is also made for an eleventh electronic switching unit SEB that is connected at input to the third input phase pole E3 and is connected at output to the third output phase pole AP3.

In this refinement, just one output phase pole, the first output phase pole AP1 in the example, may perform a phase change. This is advantageous in particular for power outlets of electric vehicles, since charging is performed either in single-phase mode or in three-phase mode. No phase change therefore needs to be performed by an electric vehicle in the case of approximately symmetrical three-phase loading/charging; a phase change may be performed in the case of only single-phase loading.

Figure 8:
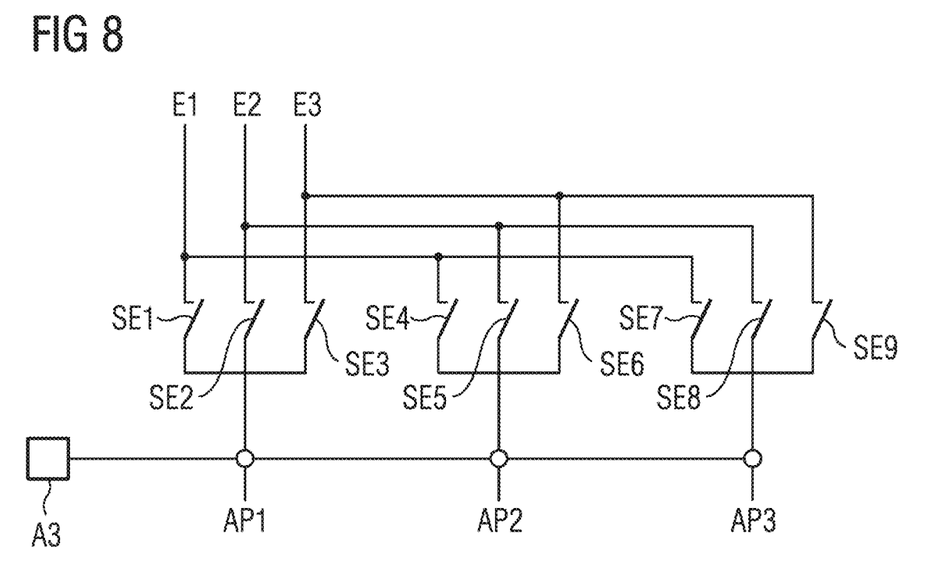

FIG. 8 shows a variant of a section of the circuit according to FIG. 7, with the difference that:

fourth, fifth and sixth electronic switching units SE4, SE5, SE6 are provided, wherein the fourth electronic switching unit SE4 is connected at input to the first input phase pole E1, the fifth electronic switching unit SE5 is connected at input to the second input phase pole E2 and the sixth electronic switching unit SE6 is connected at input to the third input phase pole E3, the fourth, fifth and sixth electronic switching unit SE4, SE5, SE6 are connected at output to the second output phase pole AP2, seventh, eighth and ninth electronic switching units SE7, SE8, SE9 are provided, wherein the seventh electronic switching unit SE7 is connected at input to the first input phase pole E1, the eighth electronic switching unit SE8 is connected at input to the second input phase pole E2 and the ninth electronic switching unit SE9 is connected at input to the third input phase pole E3, the seventh, eighth and ninth electronic switching unit SE7, SE8, SE9 are connected at output to the third output phase pole AP3.

In one refinement according to FIG. 8 (referring back to FIG. 7), which may be combined with the other refinements, provision is made for the voltage sensor A1 for ascertaining the level of the voltage of the first, second and third input phase pole E1, E2, E3. And also the internal current sensor A3 for ascertaining the level of the current of the first, second and third output phase pole AP1, AP2, AP3. The control unit A4 is connected to the voltage sensor A1, the internal current sensor A3, the first to ninth electronic switching unit SE1 to SE9 and designed such that, depending on the level of the voltage of the first, second and third input phase pole and depending on the level of the current of the first, second and third output phase pole, an input phase pole is connected to an output phase pole by way of the respective electronic switching unit, wherein:

the output phase pole having the highest current is connected to the input phase pole having the highest voltage, the output phase pole having the second-highest current is connected to the input phase pole having the second-highest voltage, the output phase pole having the third-highest current is connected to the input phase pole having the third-highest voltage.

If for example the voltage of the first input phase pole is 228 volts, that of the second input phase pole is 230 volts and that of the third input phase pole is 232 volts; if the current of the first output phase pole is 42 amperes, of the second output phase pole is 44 amperes and of the third output phase pole is 38 amperes;

then the second output phase pole is connected to the third input phase pole, the first output phase pole is connected to the second input phase pole and the third output phase pole is connected to the first input phase pole.

In another refinement according to FIG. 8 (referring back to FIG. 7), which may be combined with the other refinements, provision is made for the externally arranged external current sensor C, for example outside the housing GEH, for ascertaining the level of the current IP1, IP2, IP3, INN of the first, second and third energy source-side phase conductors L1, L2, L3 and of the neutral conductor N of the low-voltage circuit (these being connected to the first, second and third input phase poles in the form of a branch). And also the internal current sensor A3 for ascertaining the level of the current of the first, second and third output phase pole AP1, AP2, AP3. The control unit A4 is connected to the external and internal current sensor C, A3 of the first to ninth electronic switching unit SE1 to SE9 and designed such that, depending on the level of the current IP1, IP2, IP3 and possibly INN of the first, second and third energy source-side phase conductor (possibly neutral conductor N) and depending on the level of the current of the first, second and third output phase pole (AP1, AP2, AP3), an input phase pole is connected to an output phase pole by way of the respective electronic switching unit SE1 to SE9. Wherein:

the output phase pole having the highest current is connected to the input phase pole whose energy source-side phase conductor has the lowest current level, the output phase pole having the second-highest current is connected to the input phase pole whose energy source-side phase conductor has the second-lowest current level, the output phase pole having the third-highest current is connected to the input phase pole whose energy source-side phase conductor has the third-lowest current level.

That is to say, if for example the current IP1 of the first phase conductor L1 is 500 amperes, the current IP2 of the second phase conductor L2 is 400 amperes and the current IP3 of the third phase conductor L3 is 250 amperes;

if the current of the first output phase pole is 42 amperes, of the second output phase pole is 44 amperes and of the third output phase pole is 38 amperes;

then the second output phase pole is connected to the third input phase pole, the first output phase pole is connected to the second input phase pole and the third output phase pole is connected to the first input phase pole.

In one refinement according to FIG. 8 (referring back to FIG. 7), which may be combined with the other refinements, provision is made only for the communication interface KS for a communication signal. The control unit, which is connected to the communication interface KS and the first to ninth electronic switching unit SE1 to SE9, is designed such that, depending on the communication signal, at least one input phase pole is connected to an output phase pole by way of the respective electronic switching unit. In particular, two input phase poles are connected to two output phase poles by way of the respective electronic switching unit or three input phase poles are connected to three output phase poles by way of the respective electronic switching unit. Wherein a respective phase is switched through from an input phase pole to an output phase pole such that two different phases are never connected to one another.

Figure 9:
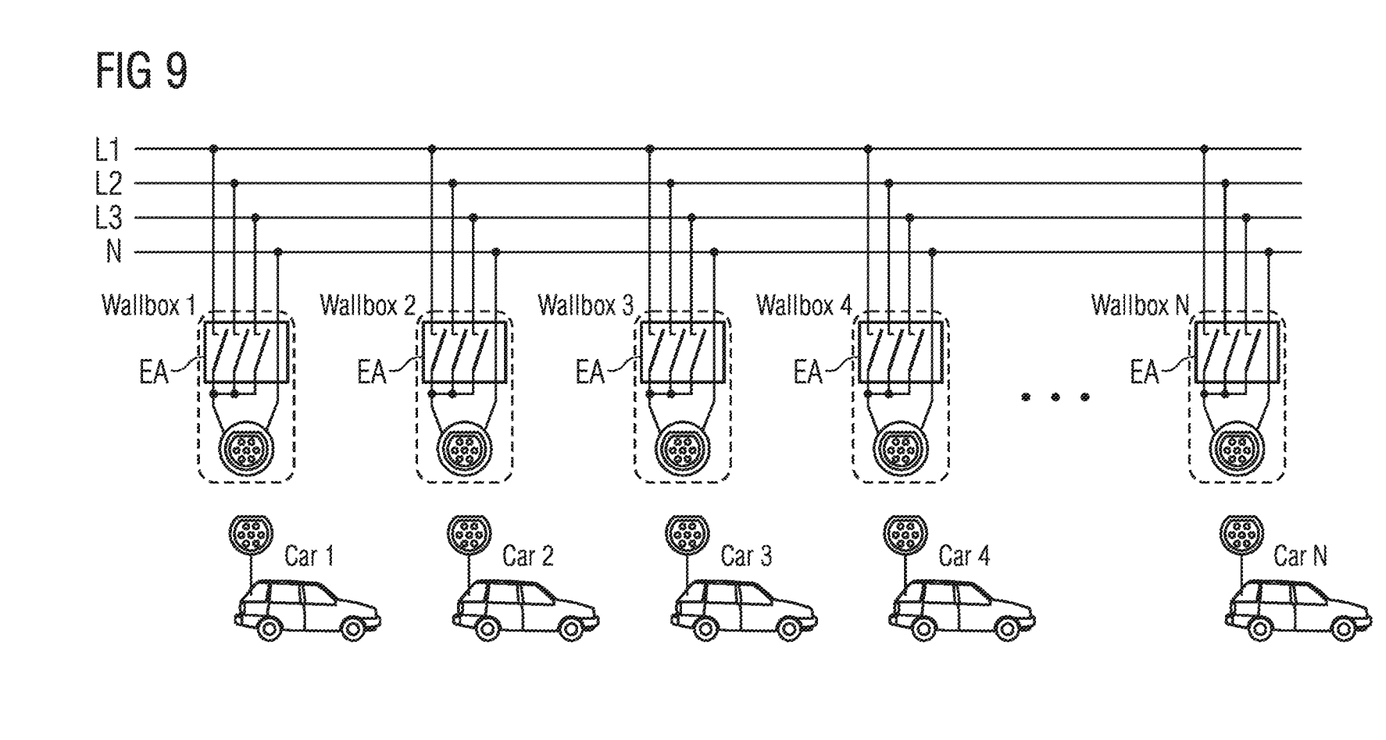

FIG. 9 shows a circuit according to FIG. 5, with the difference that a device EA according to the invention according to FIG. 6, 7 or 8 is provided in the at least one or all power outlets Wallbox 1 to Wallbox N.

Embodiments of the invention, including its advantages, is intended to be explained again below in other terms.

The phase selection takes place without mechanical switching elements, on the basis of power semiconductors (silicon, silicon carbide/SiC or gallium nitride/GaN). For example already integrated measurement and control technology of an electronic switching unit may for example use ascertained current or/and voltage values to independently identify the phase to which the power should be switched. This may be performed prior to or continuously during operation, or adapted or changed over prior to or during operation. The electronic switching units may also be selected and driven by external systems D, such as for example grid management technology or (charging) management systems.

This has the advantage that:

electronic switching units that perform semiconductor-based opening and closing of an electrical connection—that is to say switching, are not subject to mechanical wear and are thus able to perform a much higher number of switching operations.

The selection of the phase is able to be changed during operation without any problems and largely without interruption (commutation).

Using wide-bandgap power semiconductors (SiC-based, GaN-based) eliminates unnecessary power losses through coils and drives for electromechanical switching elements.

External/superordinate systems may offer further services from supplied data and information, and act "externally" on the electronic switching units (semiconductor-based).

Measured values from sensors are available in real time to control the electronic switching units.

The semiconductor-based electronic switching units are able to switch between two phases and thus commutate the power in a time interval of less than one millisecond.

The semiconductor-based electronic switching units are able to perform several million switching operations and are thus able, in contrast to electromechanical switching units, also to take on operational switching.

The series on-state resistance of electronic switching units in the on state is approximately equal to the transfer resistance of mechanical contacts. This thus eliminates power losses in coils of contactors and thermal losses in bimetals of thermal trip mechanisms.

By virtue of a communication interface, it is possible to perform IP-based communication with superordinate systems, for example by way of TCP/IP, Modbus, etc.

Although the invention has been described and illustrated in more detail by the exemplary embodiment, the invention is not restricted by the examples disclosed, and other variations may be derived therefrom by a person skilled in the art without departing from the scope of protection of the invention.

The invention claimed is:

1. A device for a low-voltage circuit, the device comprising:
 a four-pole input connection for a three-phase AC circuit including a neutral conductor, the four-pole input connection including a first input phase pole, a second input phase pole, a third input phase pole and an input neutral conductor pole;
 a two-pole output connection including a first output phase pole and an output neutral conductor pole;
 a first connection between the input neutral conductor pole and the output neutral conductor pole;
 a first electronic switching unit, a second electronic switching unit and a third electronic switching unit to perform semiconductor-based closing and opening of an electrical connection, the first electronic switching unit being connected at an input to the first input phase pole, the second electronic switching unit being connected at an input to the second input phase pole and the third electronic switching unit being connected at an input to the third input phase pole, and the first electronic switching unit, the second electronic switching unit and the third electronic switching unit being connected at an output to the first output phase pole;
 a voltage sensor to ascertain a level of a voltage of the first input phase pole, the second input phase pole and the third input phase pole; and
 a controller connected to the voltage sensor, the first electronic switching unit, the second electronic switching unit and the third electronic switching unit, the controller designed such that,
  depending on the level of the voltage of the first input phase pole, the second input phase pole and the third input phase pole, the first input phase pole, the second input phase pole or the third input phase pole is connected to the first output phase pole via a respective electronic switching unit, the first output phase pole being connected, in each case, to an input phase pole including a relatively highest voltage,
 wherein the first electronic switching unit, the second electronic switching unit and the third electronic switching unit are designed as semiconductor switches,
 wherein a frequency sensor for ascertaining a frequency of an electric current of the first input phase pole, the second input phase pole and the third input phase pole is provided and is connected to the controller to perform a phase change at a zero crossing of the electric current,
 wherein an assignment is changed periodically during operation at certain time intervals depending on how a voltage level changes, and
 wherein a change in the assignment takes place at least after a plurality of cycles through sinusoidal oscillation of an AC voltage.

2. The device of claim 1, further including an internal current sensor for ascertaining the level of a current of the first output phase pole, wherein the internal current sensor is connected to the controller.

3. A system for a three-phase low-voltage circuit including a neutral conductor and a first phase conductor, a second phase conductor and a third phase conductor, connected to an energy source and to which a plurality of at least one of single-phase or three-phase outputs for consumers are connected, the first phase conductor, the second phase conductor and the third phase conductor including an energy source-side external current sensor for ascertaining a level of a current of the first phase conductor, the second phase conductor and the third phase conductor, wherein
 at least one output includes the device of claim 2, and
 wherein the external current sensor is connected to at least the device.

4. A system for a three-phase low-voltage circuit including a neutral conductor and a first phase conductor, a second phase conductor and a third phase conductor, connected to an energy source and to which a plurality of at least one of single-phase or three-phase outputs for consumers are connected, the first phase conductor, the second phase conductor and the third phase conductor including an energy source-side external current sensor for ascertaining a level of a current of the first phase conductor, the second phase conductor and the third phase conductor, wherein
 at least one output includes the device of claim 1, and
 the external current sensor is connected to at least the device.

5. The device of claim 1, wherein the first electronic switching unit, the second electronic switching unit and the third electronic switching unit are designed as semiconductor switches and have power semiconductors based on silicon, silicon carbide, silicon carbon, gallium, gallium nitride or gallium nitrogen.

6. A device for a low-voltage circuit, the device comprising:
 a four-pole input connection for a three-phase AC circuit including a neutral conductor, the four-pole input connection including a first input phase pole, a second input phase pole, a third input phase pole and an input neutral conductor pole;
 a four-pole output connection including a first output phase pole, a second output phase pole, a third output phase pole and an output neutral conductor pole;
 a first connection between the input neutral conductor pole and the output neutral conductor pole;
 a first electronic switching unit, a second electronic switching unit and a third electronic switching unit to perform semiconductor-based closing and opening of an electrical connection, the first electronic switching unit being connected at an input to the first input phase pole, the second electronic switching unit being connected at an input to the second input phase pole and the third electronic switching unit being connected at an input to the third input phase pole, the first electronic switching unit, the second electronic switching unit and the third electronic switching unit being connected at an output to the first output phase pole;

a fourth electronic switching unit, a fifth electronic switching unit and a sixth electronic switching unit to perform semiconductor-based closing and opening of an electrical connection, the fourth electronic switching unit being connected at an input to the first input phase pole, the fifth electronic switching unit being connected at an input to the second input phase pole and the sixth electronic switching unit being connected at an input to the third input phase pole, the fourth electronic switching unit, the fifth electronic switching unit and the sixth electronic switching unit being connected at an output to the second output phase pole;

a seventh electronic switching unit, an eighth electronic switching unit and a ninth electronic switching unit to perform semiconductor-based closing and opening of an electrical connection, the seventh electronic switching unit being connected at an input to the first input phase pole, the eighth electronic switching unit being connected at an input to the second input phase pole and the ninth electronic switching unit being connected at an input to the third input phase pole, the seventh electronic switching unit, the eighth electronic switching unit and the ninth electronic switching unit being connected at an output to the third output phase pole;

a voltage sensor for ascertaining a level of a voltage of the first input phase pole, the second input phase pole and the third input phase pole;

an internal current sensor for ascertaining a level of a current of the first output phase pole, the second output phase pole and the third output phase pole;

a controller connected to the voltage sensor, the internal current sensor, and the first to ninth electronic switching units, the controller designed such that, depending on the level of the voltage of the first input phase pole, the second input phase pole and the third input phase pole and depending on the level of the current of the first output phase pole, the second output phase pole and the third output phase pole, a respective input phase pole is connected to a respective output phase pole by way of a respective one of the first to ninth electronic switching units, wherein an output phase pole having a relatively highest current is connected to an input phase pole having a relatively highest voltage, an output phase pole having a relatively second-highest current is connected to an input phase pole having a relatively second-highest voltage, an output phase pole having a relatively third-highest current is connected to an input phase pole having a relatively third-highest voltage, the first to ninth electronic switching units are designed as semiconductor switches, a frequency sensor for ascertaining a frequency of electric current of the first input phase pole, the second input phase pole and the third input phase pole is provided and is connected to the controller to perform a phase change at a zero crossing of the electric current, an assignment is changed periodically during operation at certain time intervals depending on how a voltage level changes, and a change in the assignment takes place at least after a plurality of cycles through a sinusoidal oscillation of an AC voltage.

7. The device of claim 6, wherein the first to ninth electronic switching units include power semiconductors based on silicon, silicon carbide, silicon carbon, gallium, gallium nitride or gallium nitrogen.

8. A system for a three-phase low-voltage circuit including a neutral conductor and a first phase conductor, a second phase conductor and a third phase conductor, connected to an energy source and to which a plurality of at least one of single-phase or three-phase outputs for consumers are connected, the first phase conductor, the second phase conductor and the third phase conductor including an energy source-side external current sensor for ascertaining a level of a current of the first phase conductor, the second phase conductor and the third phase conductor, wherein at least one output includes the device of claim 6, and the external current sensor is connected to at least the device.

9. A device for a low-voltage circuit, the device comprising:

a four-pole input connection for a three-phase AC circuit including a neutral conductor, the four-pole input connection including a first input phase pole, a second input phase pole, a third input phase pole and an input neutral conductor pole;

a four-pole output connection including a first output phase pole, a second output phase pole, a third output phase pole and an output neutral conductor pole;

a first connection between the input neutral conductor pole and the output neutral conductor pole;

a first electronic switching unit, a second electronic switching unit and a third electronic switching unit to perform semiconductor-based closing and opening of an electrical connection, wherein the first electronic switching unit is connected at an input to the first input phase pole, the second electronic switching unit is connected at an input to the second input phase pole and the third electronic switching unit being connected at an input to the third input phase pole, and wherein the first electronic switching unit, the second electronic switching unit and the third electronic switching unit are connected at an output to the first output phase pole;

a fourth electronic switching unit, a fifth electronic switching unit and a sixth electronic switching unit to perform semiconductor-based closing and opening of an electrical connection, wherein the fourth electronic switching unit is connected at an input to the first input phase pole, the fifth electronic switching unit is connected at an input to the second input phase pole and the sixth electronic switching unit is connected at an input to the third input phase pole, and wherein the fourth electronic switching unit, the fifth electronic switching unit and the sixth electronic switching unit are connected at an output to the second output phase pole;

a seventh electronic switching unit, an eighth electronic switching unit and a ninth electronic switching unit to perform semiconductor-based closing and opening of an electrical connection, wherein the seventh electronic switching unit is connected at an input to the first input phase pole, the eighth electronic switching unit is connected at an input to the second input phase pole and the ninth electronic switching unit is connected at an input to the third input phase pole, and wherein the seventh electronic switching unit, the eighth electronic switching unit and the ninth electronic switching unit are connected at an output to the third output phase pole;

a communication interface for a communication signal;

a controller connected to the communication interface and the first to ninth electronic switching units, the controller designed such that, depending on the communication signal, at least one input phase pole is connected to an output phase pole by way of a respective one of the first to ninth electronic switching units;

wherein the first to ninth electronic switching units are designed as semiconductor switches;

wherein a frequency sensor for ascertaining a frequency of an electric current of the first input phase pole, the second input phase pole and the third input phase pole is provided and is connected to the controller to perform a phase change at a zero crossing of the electric current;

wherein an assignment is changed periodically during operation at certain time intervals depending on how a voltage level changes; and wherein a change in the assignment takes place at least after a plurality of cycles through a sinusoidal oscillation of an AC voltage.

10. The device of claim 9, wherein, depending on the communication signal, two input phase poles are connected to two output phase poles by way of a respective one of the first to ninth electronic switching units.

11. The device of claim 10, wherein, depending on the communication signal, three input phase poles are connected to three output phase poles by way of a respective one of the first to ninth electronic switching units.

12. A system for a three-phase low-voltage circuit including a neutral conductor and a first phase conductor, a second phase conductor and a third phase conductor, connected to an energy source and to which a plurality of at least one of single-phase or three-phase outputs for consumers are connected, the first phase conductor, the second phase conductor and the third phase conductor including an energy source-side external current sensor for ascertaining a level of a current of the first phase conductor, the second phase conductor and the third phase conductor, wherein at least one output includes the device of claim 10, and the external current sensor is connected to at least the device.

13. The device of claim 9, wherein, depending on the communication signal, three input phase poles are connected to three output phase poles by way of a respective one of the first to ninth electronic switching units.

14. The device of claim 9, wherein the first to ninth electronic switching units include power semiconductors based on silicon, silicon carbide, silicon carbon, gallium, gallium nitride or gallium nitrogen.

15. A method for a three-phase low-voltage circuit including a neutral conductor and a first phase conductor, a second phase conductor and a third phase conductor, the method comprising:

performing, via a first electronic switching unit, a second electronic switching unit and a third electronic switching unit of the three-phase low-voltage circuit, semiconductor-based closing and opening of an electrical connection, wherein the first electronic switching unit is connected at an input to the first phase conductor, the second electronic switching unit is connected at an input to the second phase conductor and the third electronic switching unit is connected at an input to the third phase conductor, and wherein the first electronic switching unit, the second electronic switching unit and the third electronic switching unit are connected at an output to a first output phase conductor;

ascertaining, via a voltage sensor, a level of a voltage of the first phase conductor, the second phase conductor and the third phase conductor;

connecting, depending on the level of the voltage of the first phase conductor, the second phase conductor and the third phase conductor, the first phase conductor, the second phase conductor and the third phase conductor to the first output phase conductor via a respective electronic switching unit of the first electronic switching unit, the second electronic switching unit and the third electronic switching unit, wherein the first output phase conductor is connected to a phase conductor having a relatively highest voltage, and wherein the first electronic switching unit, the second electronic switching unit and the third electronic switching unit are designed as semiconductor switches;

ascertaining a frequency of an electric current of a first input phase pole, a second input phase pole and a third input phase pole via a frequency sensor, and connecting the frequency sensor to a controller to perform a phase change at a zero crossing of the electric current; and changing an assignment of connection, periodically during operation at certain time intervals, depending on how a voltage level changes, wherein a change in the assignment takes place at least after a plurality of cycles through a sinusoidal oscillation of an AC voltage.

16. The method of claim 15, wherein the first to third electronic switching units include power semiconductors based on silicon, silicon carbide, silicon carbon, gallium, gallium nitride or gallium nitrogen.

* * * * *